Sept. 8, 1964  H. H. BURK, JR  3,148,325
POSITION INDICATING MEANS

Filed March 24, 1961  2 Sheets-Sheet 1

INVENTOR
HURDIE H. BURK JR.
BY *George J. Netter*
ATTORNEY

Sept. 8, 1964     H. H. BURK, JR     3,148,325

POSITION INDICATING MEANS

Filed March 24, 1961     2 Sheets-Sheet 2

United States Patent Office 3,148,325
Patented Sept. 8, 1964

3,148,325
POSITION INDICATING MEANS
Hurdie H. Burk, Jr., Vestal, N.Y., assignor to International Business Machines Corporation, New York, N.Y., a corporation of New York
Filed Mar. 24, 1961, Ser. No. 98,132
4 Claims. (Cl. 323—51)

The present invention relates to position indicating means, and, in particular, to such a means for providing an electrical signal output when a predetermined physical positioning relationship is obtained.

There are many situations where it is desirable to obtain an indication quickly and to a high degree of accuracy when objects have a particular angular or linear relationship to another.

Areas of endeavor where this type of knowledge can be important are, for example, the automatic machining of materials, determination of revolutions per unit time of a tachometer, instrumentation and controlling piston displacement in hydraulic control or precise material loading operations, to name but a few.

One common technique for handling requirements of this nature is to utilize relays of the electromagnetic type actuated by switches which are opened and closed on physical engagement with operating members carried by one of the members whose position is to be determined. Although arrangements of this type can be very satisfactory for many applications, the precision of position determination obtainable is not sufficient in other situations, due to errors being introduced by such things as relay bounce, reaction displacements caused by the force required to close and/or open the switch, relatively low speed of response, and the like.

It is, therefore, a primary object of the invention to provide a high accuracy position indicating device not requiring mechanical engagement limit switches.

Another object of the invention is to provide a position indicating device capable of maintaining a high state of precision throughout a relatively long operating life.

A further object is the provision of such a means generating an electric signal when a predetermined physical positioning relation of an object to a reference base is obtained.

A still further object is the provision of a device for indicating physical positioning by relating it to the rotation of a shaft.

Briefly, the invention provides a means for producing a magnetic field in a localized area upon being energized by electrical signals from a suitable voltage source. A flux actuable device is located in a sufficiently spaced relation with respect to the field as to be beyond the direct air-path influence of the flux so generated. A flux-linking body is arranged for movement along a path between the means and the device, and in opposed relation to both, so that when the linking body is brought into registry with them the flux is operably linked to the device causing an indication signal of the registry to be generated by the device. Relating this position of registry to a preassigned reference point provides a correlation of the indication signal to a particular linear or angular position.

The foregoing and other objects, features, and advantages of the invention will be apparent from the following more particular description of a preferred embodiment of the invention, as illustrated in the accompanying drawings.

Figure 1:
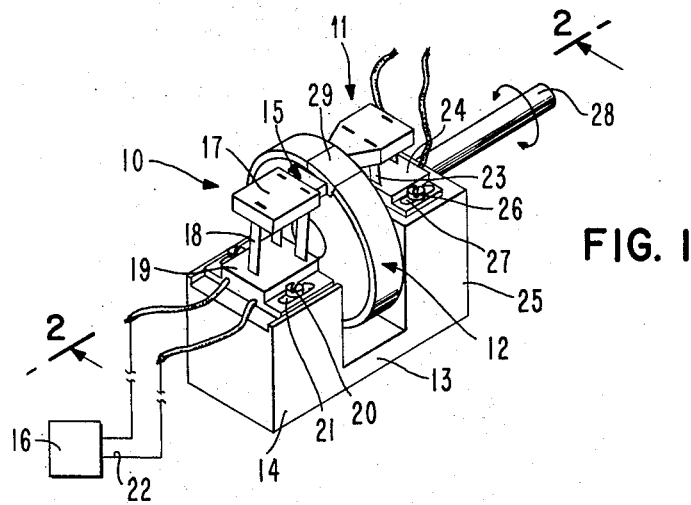
FIG. 1 is a perspective view of a position indicating device made in accordance with and embodying the principles of the invention.

With reference now to the drawings and particularly to FIG. 1, there is shown an embodiment of the apparatus of the invention which has for its particular object the generation of an electric signal when an exact predetermined angular position of a shaft is obtained. Broadly, the apparatus comprises a magnetic flux generator 10, a sensing head 11, and a linking means 12 all mounted on a U-shaped support base 13 in such a manner as to act cooperatively for accomplishing the position indicating function of the invention.

The flux generator 10 is fixedly secured to the extremity of one leg 14 of the support base 13 and, in a way that will be more explicitly set forth below, provides a magnetic field in the region indicated generally at 15 when energized by electrical energy provided from a suitable power source 16. The generator 10 includes in its major structural aspects a generating head 17 secured to the extremities of a plurality of leaf spring supports 18 the other extremities of which are fixedly received in the surface of a mounting plate 19. The mounting plate is slidably and adjustably secured to the upper surface of the leg 14 of the support base by members 20 threadably received in the base 13 through elongated openings 21.

Energizing voltage is supplied to the generating head via leads 22 and selected ones of the spring supports 18 from the power source 16. This dual function of the spring supports is important in that it obviates the condition of having the head 17 displaced from its required positioning relationship to the remainder of the apparatus on application of a force to the leads, which would be the case if the leads were connected directly to the head.

The sensing head 11 is supported on the extremities of a plurality of springlike supports 23 similar to the supports 18, the other extremities of which are secured to a support plate 24. The support plate, in turn, is adjustably secured to the extremity of the leg 25 of the base 13 by threaded members 26 received through slots 27 in the plate.

The height and condition of the legs 14 and 25 of the base are such relative to the dimensions of the flux generator 10 and the sensing head 11, as to dispose the operative portions of the two in registry with one another and in very nearly the same plane. However, the generator and head are spaced from one another a sufficient distance as to be substantially non-interactive until operatively related in the special way of the invention.

The linking member 12 is of disc-shaped geometry and supported within the gap of the support base 13 in a substantially upright position by a shaft 28 rotatably journaled in an opening in the leg 25, the etxremity of which shaft is affixed perpendicularly to the center of the member. On rotation of the shaft, the member moves so as to present continuously a margin of the disc intermediate the sensing head 11 and the generating head 17, and in opposed relation to each.

When properly positioned, the relative location of the disc, the generating head and the sensing head are such that the two heads are continuously and resiliently urged into contact with the facing surfaces of the member 12 by the action of spring supports 18 and 23, respectively.

Received within the margin of the disc 12 is a flux transfer means 29 incorporated therein as an integral part of the disc body. On rotation of the member 12, this insert is so positioned that at one point it is in opposed relation to both the flux generating head and the sensing head providing a direct low-reluctance path for the magnetic flux to the sensing head. Accordingly, it is seen that the only time a flux linking relation between the generator and the sensing head is obtained is when the transfer means 29 is in registry with the two. Because of the described special arrangement of the heads and transferring means, actuation of the sensing head is only provided at a very precise position of the shaft 28, which position can be reproduced with a high degree of accuracy a large number of times, with substantially no loss in reliability and by rotating the shaft in either direction. It is this relationship of the position of the shaft 28 with respect to the generation of a signal which is the broad basis on which the invention rests. Accordingly, it is to be especially noted that a relatively high degree of accuracy of positioning of the various components of the apparatus to one another must be obtained in manufacture. For example, journaling of shaft 28 in the base 13 must be provided with close tolerances and all play and swivel kept to an absolute minimum; otherwise, errors can be introduced in a determination that is as large, or larger, then the permitted variance.

Figure 2:
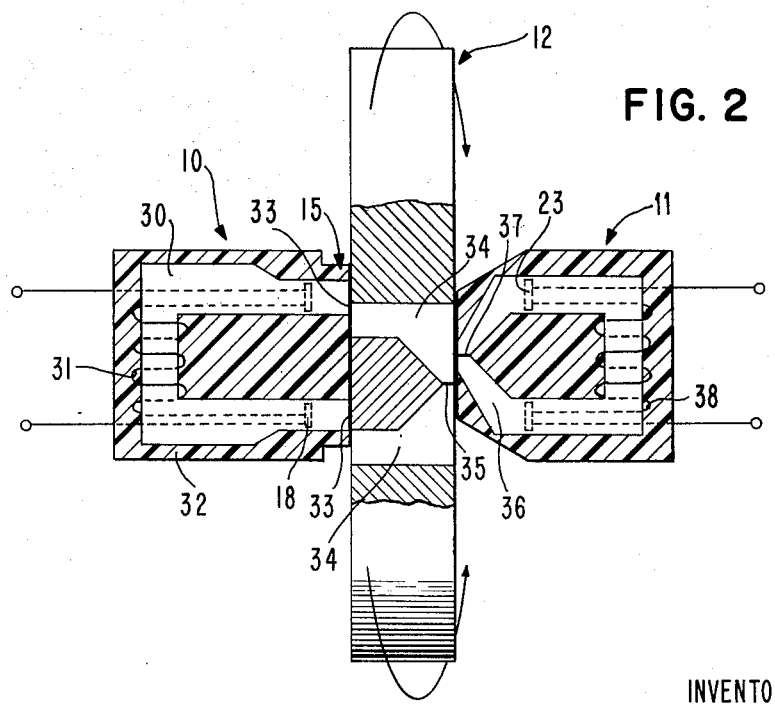
FIG. 2 is an enlarged, fragmentary sectional view taken along line 2—2 of FIG. 1.

With reference now to FIG. 2, a description of the more detailed features of the apparatus of FIG. 1 will be set forth. The flux generating head 17 includes a substantially U-shaped magnetic core 30 with energization windings 31 arranged in inductive surrounding relationship to the crossbar of the core. The core and windings are encapsulated in a body 32 of some good electrical insulating material which also possesses the requisite physical properties permitting it to be ground and lapped. The latter feature is important since the portion 15 is, for best results, lapped to the facing surface of the linking means 12 providing a substantially point-for-point contacting relation between the surfaces that presents a low reluctance path to magnetic flux. Additionally, the encapsulant should have a heat coefficient of expansion closely approximating that of the core 30 to eliminate errors resulting from unequal expansions at elevated temperatures.

The legs of the core 30 as shown have their outermost parts formed to provide facing portions 33 of reduced surface area with respect to the cross-sectional area of the remainder of the core, which serves to provide an increase in the flux density at the facing portions or flux transfer regions.

Although any of a number of different magnetic core materials are suitable for constructing the core 30 where the production of magnetic flux is the sole requirement, a magnetic ceramic material not only has the requisite magnetic properties, but it also has the additional advantages of a low coefficient of heat expansion and light weight. One such ceramic material providing these superior qualities is Ferroxcube manufactured by Ferroxcube Corporation of America, 149 East Bridge Street, Saugerties, New York.

For full compatability with the composite structure of the generating head and to lessen thereby the possibility of malfunction under difficult environments, the linking member 12 is composed of a light-weight material having a coefficient of expansion closely approximating that of the core 30, and, of course, that of the encapsulant. A severe mismatch in expansion coefficients of the different cooperating parts of the device can result in "sticking" or like malfunctioning with a concomitant reduction in accuracy. The light-weight feature is advantageous in reducing the power requirements for the drive apparatus.

The flux transfer means 29 consists of a pair of L-shaped core extension members 34 of substantially identical construction with their respective cross legs directed toward and spaced slightly from one another while the upright portions are directed toward the facing surfaces of the core 30 as described above. On rotating the member 12 one position is reached where an extremity of each of the members 34 is in flush contacting relation with the corresponding surface of one of the core legs.

The cross-legs of the members 34 are separated from one another by a narrow gap 35 having a generally slot shape. As a consequence of this relatively small gap and the reduced cross-sectional area of the extension members adjacent the gap as compared with the major dimensions of the core 30, impulsing the generator will result in a high flux density within the gap. In fact, the most sharply defined indication effects are produced by the novel device when saturation of the core extension walls forming the gap is achieved.

The members 34 can be composed of any material having relatively low magnetic reluctance and remanence properties; however, for the same reasons advanced above in regard to the construction of the linking means 12, best overall results are obtainable with a magnetic ceramic.

The sensing head 11 comprises a core body 36 having a single slotted gap 37 such that when operatively positioned, the gap 37 coincides with the gap 35, i.e., when the transfer means is in registry with the facing portions 33 of the core 30. The gap 35 is significantly smaller than gap 37 and, in certain cases, a specific ratio of gap widths is provided to achieve unique results which will be expanded upon below.

A sensing coil 38 is inductively wound about the core body 36, and the core and coil windings are encapsulated similarly to the generating head 17 with the portion containing the gap 37 faced off to make flush contact with the member 12.

It is to be understood that, although the mechanical relationship of the linking means 12 to the sensing head 11 and to the head 17 is specified as a flush contacting one, magnetically a "space" exists at these regions which is reflected as reluctance in the magnetic circuit. This reluctance must be kept small and, in particular, its value cannot exceed the equivalent reluctance of the air gap 35.

In operation, rotating the shaft 28 a sufficient amount brings the transfer means 29 into registry with the facing portions 33 and the gaps 35 and 37 into coincidence. The required amount of rotation to accomplish this is determined by the initial setting of the shaft from which linear and/or angular position change is effected. At the time of gap coincidence, flux generated by the head 17 is linked to the sensing head 11 inducing an indication voltage in the sensing coil 38. As long as this positioning arrangement is maintained the generation and decay of flux at 15 will produce corresponding indication voltages in the sensing coil. These voltages are appropriately connected to a suitable indication or control device for utilization.

Figure 3A:
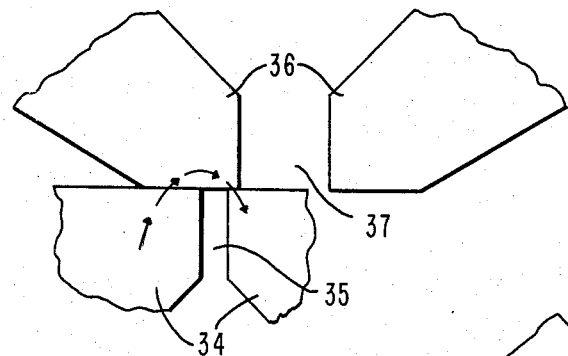
FIG. 3 (a, b and c) is a diagrammatic illustration of the relationship of certain elements of the device during operation.
Figure 3C:
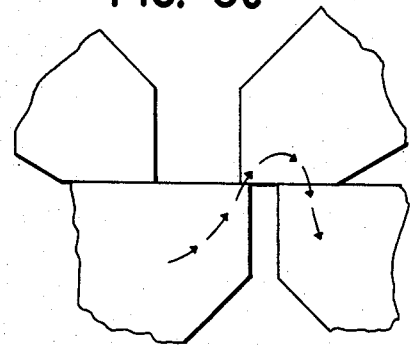
Figure 3B:
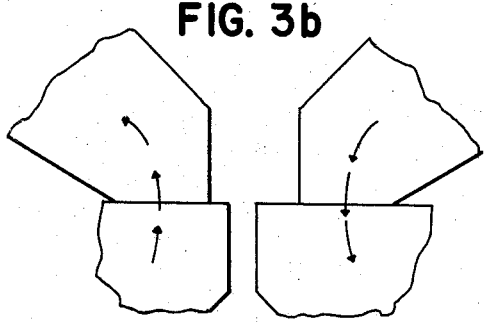
Figure 4:
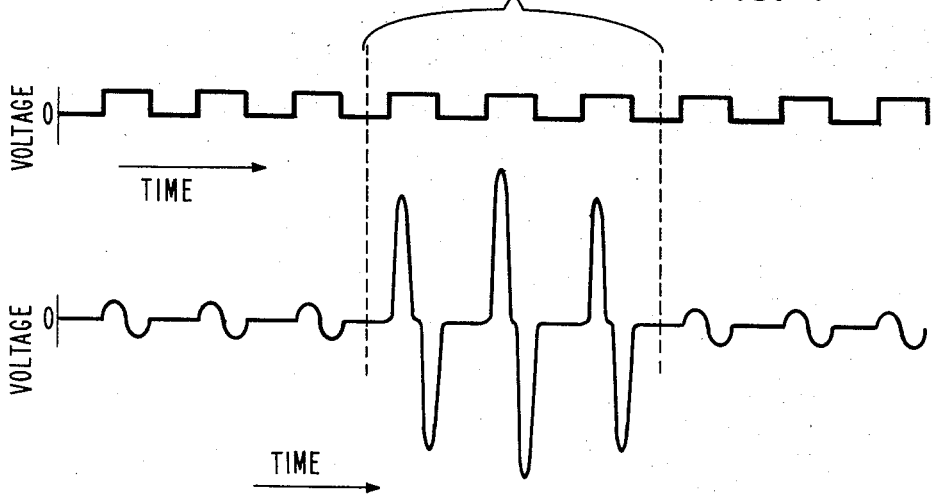
FIG. 4 is a graph indicating pertinent voltage relationships occurring at different operating times.

For a fuller understanding of the manner in which the high degree of exactness of determination is obtained, reference should be made to FIGS. 3 and 4 in conjunction with the following detailed operational description. In FIG. 3a, it is seen that the device is disposed with the gap 35 covered by the core body 36 immediately adjacent the gap 37. At this time substantially all of the flux is shorted out through a localized portion of the core body 36 and only a very small amount of flux is available to excite the coil 38. Thus, as shown in FIG. 4, only a very small indication signal is produced while the device is in this condition, which signal can either be ignored in most cases as permissible "noise" or eliminated as a factor by providing the external equipment with suitable thresholds.

On further rotation of the shaft 28 to the position shown in FIG. 3b where the gaps 35 and 37 are in coincidence an immediate change in the flux status of the core body 36 occurs. Thus, as soon as the gap 35 moves into the gap 37, the greater part of the flux present at the gap 35 begins to make a circuit through the complete core body 36 as indicated. Accordingly, a voltage is induced in the coil 38 at the same time which provides the desired indication signal that the prescribed positioning condition exists. The voltage signal generated at this time is seen to be many times that of the noise signal.

Still further rotation to the position shown in FIG. 3c produces the same condition as in 3a with substantially no signal generated.

Although, as shown in FIG. 4, there is some variation in the magnitude of the indication signal depending on the exact position of the gap 35 within gap 37, i.e., centrally located or closer to one of the pole faces, the change of primary importance with regard to the operation of the invention is from a substantially no-signal condition when the gap 35 is shielded by the core 36 to a signal condition when the gap 35 first enters the gap 37. It is this change which occurs over a very small movement of the shaft and linking means that gives rise to the precise position indicating capabilities of the novel device. Thus, this pronounced change from no-signal to signal condition (or signal to no-signal) occurs during the very small change in position of the linking member 12 from a situation where the gap 35 is barely covered by one of the poles of the core 36 to that where the same gap is barely uncovered and in coincidence with gap 37.

In addition, not only is a precise indication of the linear and/or angular movement of the shaft 28 with respect to a particular reference starting point obtainable by the device described above, but also a particular angular range is provided which is representative generally of the width of the gap 37. Thus, if the linking member is moved in one direction only, first a precise indication is obtained when the gaps first oppose one another and indication signals continue until the gap 35 leaves the gap 37 which also is precisely indicated. The movement between the point of initiation of indication signals and the point of cessation of the signals corresponds to a particular angular or linear distance from a starting reference point. This range of operation varies linearly with the width of the gap 37, that is, increasing the width increases the range.

If merely an on-off operation is desired, both gaps 35 and 37 can be made approximately the same width with it understood that the smaller the gaps, the quicker and more precise indication obtainable.

The power source 16 for driving the windings 31 of the flux generator, as noted, provides a pulse type output. In order to avoid errors being introduced in the generation of indication signals as a result of the time spacing between adjacent voltage pulses, it is necessary that the pulses be supplied at a relatively high frequency. Although dependent upon the rate of positioning change of the shaft 28, for most general uses a pulse input in the kilocycle range is adequate. Also, in the interest of accuracy, best results are obtainable when the shape of the voltage pulses closely approximates that of a square wave, i.e., having sharply rising and sharply falling leading and trailing edges, respectively. If voltages having less sharp edges are used, a corresponding reduction in the rate of change of the magnetic flux is experienced providing a slower generation of indication signals. This result is reflected as an error since a given indication signal is provided at a later time than the indicated position of the shaft, during which interval of time the shaft may have turned.

Peripheral equipment for utilizing the indication voltages can take many forms all well known in the art, the choice of which is dependent upon a number of factors including the particular type of measurement being made. Exemplary of this, the indication pulses can be utilized to present a visual display on a CRT type of display means or to energize electronic circuitry directly for producing some other desired function.

It is seen, therefore, that by the practice of the invention, a device is obtained which is capable of providing extremely accurate indications of a given predetermined angular orientation of a rotatable shaft, irrespective of the direction of rotation, with respect to a reference point. These position determinations can be made repetitively by the device a large number of times with high standards of reliability maintained throughout. This is primarily due to the reliance of the invention on magnetic means for its primary basis of operation which is an inherently rugged and dependable item only slightly affected by adverse environmental conditions.

Further, the invention is not confined solely to measurements of an angular nature but, in fact, is equally effective in measuring linear distances whether over curved or straight paths by relating the linear distance to be measured to the rotation of the shaft 28.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A position responsive signal generator comprising: a substantially U-shaped electromagnet; a source of pulse-like voltage connected to said electromagnet; a substantially U-shaped flux permeable core having a coil inductively associated therewith mounted with its gap in generally opposed relation to the gap in said electromagnet and spaced therefrom a sufficient distance as to be substantially unaffected by the inverse square law effect of the flux generated by the electromagnet; a support body mounted for movement along a path of predetermined direction and distance with respect to a reference base between the electromagnet and core; a pair of low magnetic reluctance members carried by said body arranged in spaced relation to one another such that a first pair of portions of the said members are brought into substantial registry with the legs of said electromagnet and in separate physical contact therewith as the body moves along the path, and a second pair of portions of the said members separated by a distance less than the gap in said core arranged to present the space between the said second portions in coincidence with the gap in said core simultaneously on obtaining the position of registry of said first portions whereby an indication voltage signal is induced in said coil for each voltage pulse input to the electromagnet during gap coincidence.

2. A position responsive signal generator as in claim 1, in which the reluctance members are substantially L-shaped and arranged in embedded relation to said body transversely of the path of movement with the vertical legs thereof oriented generally toward the electromagnet and the cross-legs directed toward one another and spaced.

3. A position responsive voltage signal producing means, comprising: a recurrent magnetic flux generator having an operating surface; a flux responsive voltage generator isolated from the general field effect of flux generated by said flux generator, said voltage generator including a permeable core having a single slot-shaped gap, a sensing coil in surrounding relationship to said core, and an encapsulation body in embedding relationship to said core and coil, said body and core being faced-off in the region of the gap to provide a flat operating surface exposing the gap and portions of the core immediately adjacent said gap; flux coupling means having a receiving face and a transferring face, said transferring face including a pair of flux permeable members defining a gap of slot-shaped character narrower than the gap in said voltage generator; and means for providing relative movement between said coupling means and said flux and voltage generators, such that in one position range along the path of relative movement the receiving face is opposed to the operating surface of the flux generator and the gaps are substantially aligned whereby the voltage generator is actuated by coupling with the flux output of the flux generator providing indication voltage signals solely over the position range.

4. A signal producing means as in claim 3, in which the path of relative movement is such that in positions immediately adjacent gap alignment the gap in the transferring face is in contacting covered relation to said faced-off core which provides a low reluctance return path for magnetic flux serving to inhibit flux linkage with said flux generator.

References Cited in the file of this patent

UNITED STATES PATENTS

| | | |
|---|---|---|
| 2,999,199 | Wint et al. | Sept. 5, 1961 |
| 3,005,969 | Wysocki | Oct. 24, 1961 |
| 3,061,805 | Broderson | Oct. 30, 1962 |

OTHER REFERENCES

IBM Technical Disclosure Bulletin, vol. 1, No. 4, December 1958, Electromagnetic Position Indicator, N. K. Howery.